Figure 1:
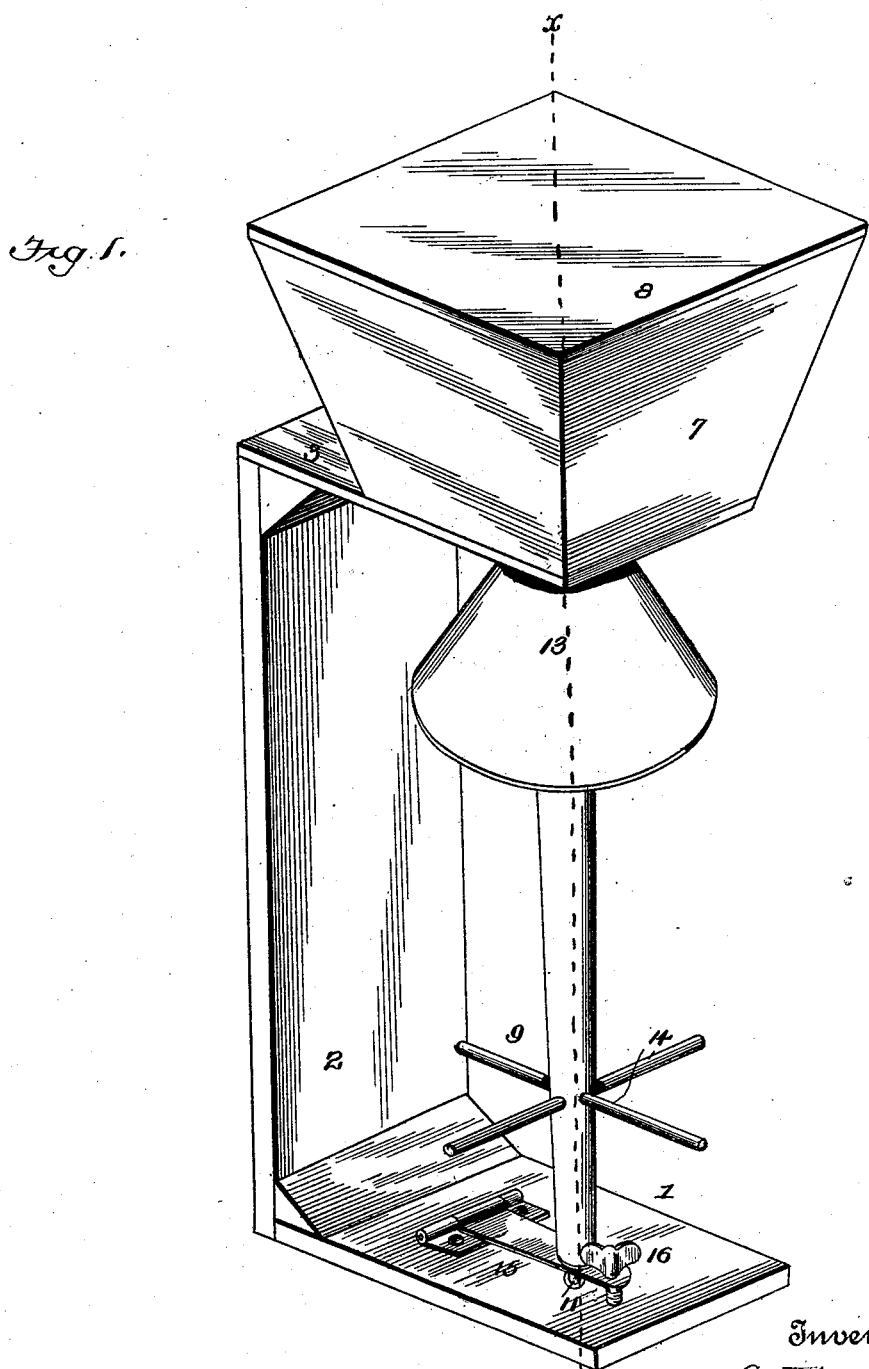

(No Model.) 2 Sheets—Sheet 1.

J. G. WHITTEN.
POULTRY FEEDER.

No. 513,747. Patented Jan. 30, 1894.

Witnesses
Inventor
John G. Whitten
By John Wedderburn
His Attorney

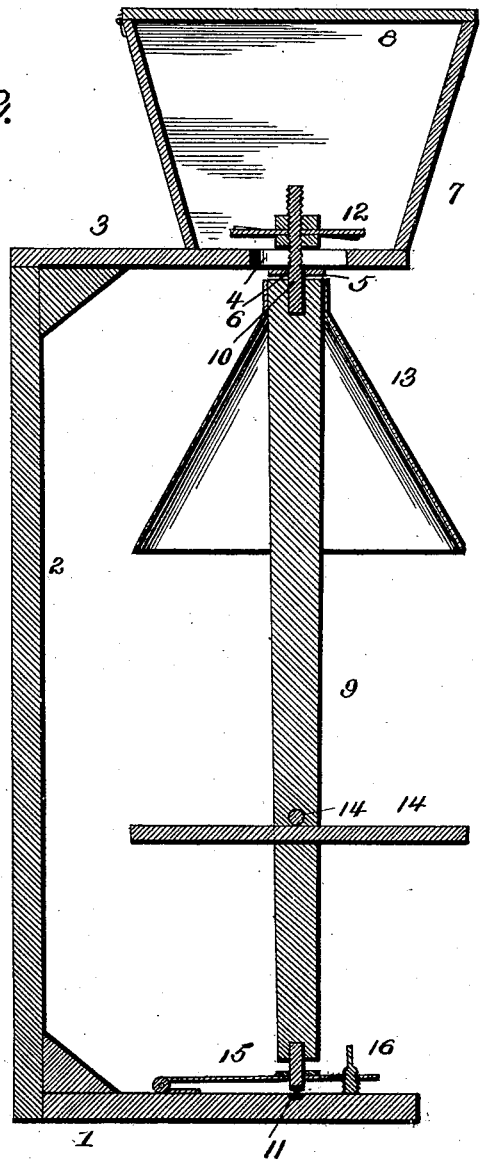

United States Patent Office.

JOHN G. WHITTEN, OF GENOA, NEW YORK.

POULTRY-FEEDER.

SPECIFICATION forming part of Letters Patent No. 513,747, dated January 30, 1894.

Application filed September 23, 1893. Serial No. 486,279. (No model.)

*To all whom it may concern:*

Be it known that I, JOHN G. WHITTEN, a citizen of the United States, and a resident of Genoa, in the county of Cayuga and State of New York, have invented certain new and useful Improvements in Poultry-Feeders; and I do hereby declare the following to be a full, clear, and exact description of the invention, such as will enable others skilled in the art to which it appertains to make and use the same.

This invention relates to a chicken or poultry feeder, and has for its object to provide means whereby the chickens or poultry are caused to exercise themselves in order to obtain their food, and thereby materially benefiting them especially if they have been confined in houses during the winter as in the northern climate.

With these and other objects in view the invention consists of the construction and arrangement of the several parts, which will be more fully hereinafter described and claimed.

In the drawings: Figure 1 is a perspective view of the improved feeder. Fig. 2 is a central section on the line $x—x$ Fig. 1.

Similar numerals of reference are employed to indicate corresponding parts in the several views.

Referring to the drawings, the numeral 1 designates a base to one end of which is secured an upright 2 having a top rest 3 attached thereto and extending over parallel with the base 1 and provided with a central opening 4 which has a metal bar 5 extending across the same with an opening 6 in the middle portion thereof. On the rest 3 is mounted a hopper 7 supplied with a hinge cover 8 and having an opening in the bottom thereof aligning with the opening 4 in the said rest. An upright 9 is mounted between the base 1 and the rest 3 and is supplied with upper and lower trunnions 10 and 11, the upper trunnion extending through the opening 6 in the bar 5 into the lower part of the hopper and has secured thereon a feeding disk 12 which regulates the amount of grain which passes through the opening in the bottom of the hopper and the opening 4 of the said rest. The said feeding disk 12, is bent down at intervals to form engaging shoulders to force the grain toward the opening in the bottom of the hopper.

On the upper end of the upright adjacent to the under side of the rest and hopper is located a conical deflector 13 which is so arranged that the grain falling therefrom will be deflected outwardly beyond the base on all sides. Below the said deflector the upright is supplied with a series of right-angularly disposed roosts or bars 14, upon which the chickens or poultry will jump in order to catch the grain and the force applied in this manner will cause a rotation of the upright and a delivery of the grain from the hopper onto the deflector 13. On the base 1 is mounted a hinged arm 15 through which the lower trunnion passes and said arm is adjustable at its outer free end by means of a thumb screw 16. By operating the thumb screw to raise or lower the arm 15, the upright is consequently raised or lowered and the feed disk having the same movement imparted thereto regulates the feed from the hopper.

The device is simple and effective in its nature, and is highly beneficial to poultry in general, for instead of permitting the poultry to fill their crops with grain and sit around and permit the same to digest, the grain is fed to them more slowly by the improved machine, and they are digesting it while eating.

It is obviously apparent that many minor changes in the construction and arrangement of the several parts might be made and substituted for those shown and described without in the least departing from the nature or spirit of the invention.

Having thus described the invention, what is claimed as new is—

1. In a poultry feeder, the combination of a supply hopper, a rotary upright or standard having roosts thereon, a deflector on the upper portion of said upright or standard, and a feed disk upon said upright and within the hopper, substantially as described.

2. In a poultry feeder, the combination of a rotary upright or standard, a hopper, and a feed disk connected to the upper end of said upright or standard and co-acting with the hopper, said upright or standard having impelling means thereon, substantially as described.

3. In a poultry feeder, the combination of an upright or standard adapted to be rotated, and having roosts or rests thereon, a base supporting the lower end of said standard or upright, a hopper above the said standard or upright, having a lower feed-opening, a feed disk on the upper end of the upright or standard and located in the lower portion of the hopper and a conical deflector secured to the upper portion of the said upright under the hopper, substantially as described.

4. In a poultry feeder the combination of a rotary upright or standard having a feed disk on the upper end thereof, and a hopper in which said feed disk is located, having a lower feed opening, and an adjustable arm engaging the lower end of said upright or standard for regulating the position of the feed disk relatively to the feed opening of the hopper substantially as described.

In testimony whereof I have signed this specification in the presence of two subscribing witnesses.

JOHN G. WHITTEN.

Witnesses:
E. S. HEATON,
B. B. ROGERS.